United States Patent Office 3,133,082
Patented May 12, 1964

3,133,082
1-SUBSTITUTED-3-PYRROLIDYLMETHYLAMINES
Yao Hua Wu, Rolland F. Feldkamp, and Homer C. Scarborough, Evansville, Ind., assignors to Mead Johnson & Company, Evansville, Ind., a corporation of Indiana
No Drawing. Filed June 9, 1960, Ser. No. 34,878
3 Claims. (Cl. 260—313)

This invention relates to novel amines and more particularly to 1-substituted-3-pyrrolidylmethylamines and to processes for preparing the same.

Broadly, the compounds of the present invention have the formula

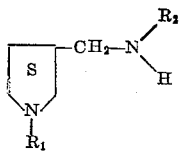

wherein $R_1$ is selected from the group consisting of hydrogen, alkyl, alkenyl, hydroxyalkyl, aralkyl (such as phenylalkyl) and alkoxyaralkyl (such as alkoxyphenylalkyl), and $R_2$ is selected from the group consisting of hydrogen, alkyl, aryl (such as phenyl), and aralkyl (such as phenylalkyl). The acid addition salts of these compounds are also contemplated as a part of this invention.

The compounds of this invention are useful as intermediates in the production of pyrrolidylquinolines and pyrrolidylquinazolines as disclosed in our copending United States application Serial No. 34,877, filed of even date herewith, now abandoned. These latter compounds have utility as anti-inflammatory agents when administered to mammals. The dosage is from about 50 to about 100 milligrams per kilogram of body weight administered from one to three times daily in the appropriate proportions. The compounds contemplated herein may be prepared by several methods, depending upon the type of product desired.

For example, the preparation of a compound of the structure

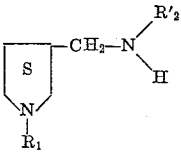

wherein $R'_2$ is aryl and $R_1$ is as previously defined, is carried out by condensing a 1-substituted-3-pyrrolidylmethyl halide with an amine of the formula $$R'_2-\overset{H}{\underset{H}{N}}-H$$

If desired, the reaction can be carried out in the presence of an acid binding agent in the form of excess amine reactant or other alkaline material, such as sodium hydride, alkali metal carbonate, or hydroxide. The reactants are preferably used in equimolar amounts. The reaction is preferably carried out under substantially anhydrous conditions. Refluxing in a solvent is one convenient method of carrying out the process. Alternatively the condensation may be performed by heating an equimolecular amount of 1-substituted-3-pyrrolidylmethyl halide and $R'NH_2$ at elevated temperature. The reaction proceeds as shown in the following equation:

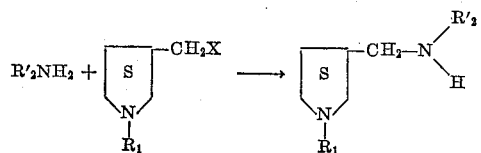

Equation I wherein X is a halogen selected from the group of chlorine and bromine and $R_1$ and $R'_2$ are as defined above.

In the preparation of compounds of the structure

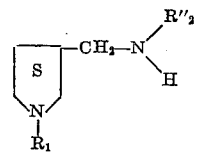

wherein $R''_2$ is hydrogen, alkyl or aralkyl and $R_1$ is as previously defined, the preferred process comprises reacting a 1-substituted-3-carboalkoxy-5-pyrrolidinone with ammonia or a primary amine to form a 1-substituted-3-carbamoyl-5-pyrrolidinone (I) as an intermediate. This intermediate compound is then reacted with an alkali metal aluminum hydride, such as sodium or lithium aluminum hydride, preferably in a solvent under substantially anhydrous conditions. The reaction is illustrated in the following equation in which the radicals $R_1$ and $R''_2$ are as above defined:

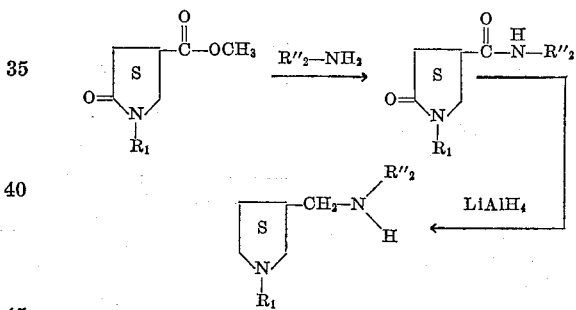

Equation II

The acid addition salts of the compound of this invention are conveniently prepared by the conventional techniques of the art. For example, the hydrochloride salt may be prepared by treating the free base in a solvent such as ethanol or heptane (anhydrous) with gaseous hydrogen chloride. Other salts, such as the benzoate, succinate, tartrate, mucate and the like, may be prepared by similar well known methods. The following examples will illustrate the preparation of the compounds of the present invention by the various processes disclosed above. The 1-substituted-3-pyrrolidylmethylhalides used in the examples were prepared by the method set forth in Feldkamp and Wu U.S. Patent No. 2,826,588. Likewise the 1-substituted-3-carbalkoxy-5-pyrrolidinones may be prepared by the method disclosed in the aforesaid patent.

The following Example I will illustrate the preparation of compounds by the method of Equation I.

EXAMPLE I

*1-methyl-3-(anilinomethyl) pyrolidine.*—A mixture of 1-methyl-3-pyrrolidylmethyl chloride (14.7 g., 0.1 mole) and aniline (9.3 g., 0.1 mole) was heated at an oil bath temperature of 160±8° for four and one-half hours. The mixture was cooled to room temperature, wetted with a small amount of water, adjusted to pH 13 with 40% sodium hydroxide, and extracted with chloroform. The combined chloroform extract was dried over anhydrous magnesium sulfate, filtered, and concentrated under reduced pressure. The oily residue was fractionated to collect 5.4 g. (29%) of N-(1-methyl-3-pyrrolidylmethyl)aniline as a colorless oil, B.P. 160–189° (37 mm.), $n_{D24}$ 1.5540. Pure sample was obtained by redistillation in vacuo, B.P. 113–115° (0.08 mm.) $n_{D25}$ 1.5540.

The following Examples II through XIV were prepared by the method of Equation II.

EXAMPLES II–XIV

*1-Substituted-3-Pyrrolidylmethylamines*

EXAMPLE II

*1-Allyl-3-(Aminomethyl)Pyrrolidine*

A. *1-allyl-3-carbamoyl-5-pyrrolidinone (intermediate).*—A solution of allylamine (186.7 g., 3.27 moles), dimethyl itaconate (517.0 g., 3.27 moles) and 1 liter of anhydrous methanol was prepared and allowed to stand at room temperature for three days to form 1-allyl-3-carbomethoxy-5-pyrrolidinone. The solution containing the 1-allyl-3-carbomethoxy-5-pyrrolidinone was then cooled in an ice bath and anhydrous ammonia was added until a large excess was present. After standing at room temperature for three days, the reaction mixture was heated to boiling to drive off most of the excess ammonia, concentrated to a syrupy residue, which was scratched with a glass rod in the presence of a small amount of butanone to separate crude 1-allyl-3-carbamoyl-5-pyrrolidinone as a crystalline product, M.P. 75–80°. Recrystallization from tetrahydrofuran yielded 399 g. (75%) of pure product, M.P. 78–80°.

Similarly prepared were the following 1-substituted 3-carbamoyl-5-pyrrolidinones: 1-methyl-, 1-ethyl-, 1-isopropyl-, 1-n-butyl-, 1-benzyl-, 1-β-phenethyl-, 1-β-(3,4-dimethoxyphenethyl)ethyl-, and 1-β-hydroxyethyl- and the following 1,3-disubstituted 5-pyrrolidinones: 1-methyl-3-methylcarbamoyl-, 1-methyl-3-benzylcarbamoyl-, and 1-(2-ethylhexyl)-3-(2-ethylhexyl)carbamoyl. Their physical constants are listed in Table I below.

TABLE I.—1-SUBSTITUTED-3-CARBAMOYL-5-PYRROLIDINONES

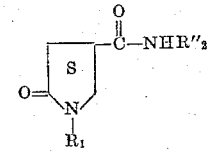

| R₁ | R″₂ | M.P., °C. | Percent yield | Formula |
|---|---|---|---|---|
| H | H | 193–195 | 66 | C₅H₈N₂O₂ |
| CH₃ | H | 140–141 | 92 | C₆H₁₀N₂O₂ |
| C₂H₅— | H | 102–103 | 79 | C₇H₁₂N₂O₂ |
| (CH₃)₂CH— | H | 151–152 | 69 | C₈H₁₄N₂O₂ |
| CH₃(CH₂)₃— | H | 122–123 | 71 | C₉H₁₆N₂O₂ |
| C₆H₅—CH₂— | H | 166–168 | 86 | C₁₂H₁₄N₂O₂ |
| C₆H₅—CH₂CH₂— | H | 159–161 | 77 | C₁₃H₁₆N₂O₂ |
| (CH₃O)₂C₆H₃—CH₂CH₂— | H | 137–139 | 82 | C₁₅H₂₀N₂O₄ |
| HOCH₂CH₂— | H | 118–119 | 72 | C₇H₁₂N₂O₃ |
| CH₃— | CH₃— | 53–55 | 95 | C₇H₁₂N₂O₃ |
| CH₃— | C₆H₅—CH₂— | ---------- | 69 | C₁₃H₁₆N₂O₃ |
| CH₃(CH₂)₃CHCH₂— <br> \|<br>C₂H₅ | CH₃(CH₂)₃CHCH₂—<br>\|<br>C₂H₅ | ¹ 195–200 | 36 | C₂₁H₄₀N₂O₂ |

¹ B.P. (1.25 mm.).

B. *1-allyl-3-(Aminoethyl)Pyrrolidine.*—To a slurry of lithium aluminum hydride (27 g., 0.71 mole) in 260 ml. of tetrahydrofuran was added dropwise with stirring a suspension of 1-allyl-3-carbamoyl-5-pyrrolidinone (60 g., 0.36 mole) in 200 ml. of tetrahydrofuran at such a rate that gentle refluxing was maintained. The addition took approximately one hour. The mixture was then refluxed and stirred for three and one-half hours. During this period, additional tetrahydrofuran (160 ml.) was added in order to keep the mixture fluid.

The reaction mixture was cooled in an ice bath, and carefully treated with 38.6 g. (2.14 moles) of water with stirring to decompose the complex. At this state, excessive foaming occurred and it was necessary to interrupt hydrolysis periodically to allow the foam to settle. The mixture was filtered with suction and the granular filter cake extracted with two 500-ml. portions of hot absolute ethanol. The filtrate and the ethanolic extracts were combined and the solvent removed under reduced pressure.

The oily residue was distilled in vacuo to yield 29.8 g. of crude 1-allyl-3-(aminoethyl)pyrrolidine as a colorless distillate, B.P. 118–124° (20 mm.). Redistillation yielded 25.1 g. (50%) of a pure product, B.P. 100° (20 mm.); $n_D^{20}$ 1.4853.

A number of additional 3-pyrrolidylmethylamines were prepared as Examples III through XIV by essentially the same procedure. Their identity and physical constants are indicated in Table II.

TABLE II.—1-SUBSTITUTED-3-PYRROLIDYLMETHYLAMINES

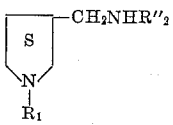

| Example | R₁ | R₂'' | B.P., °C. (mm.) | $n_D$ (° C.) | Percent yield | Formula |
|---|---|---|---|---|---|---|
| III | H | H | 78(13) | 1.4864(24) | 50 | C₅H₁₂N₂ |
| IV | CH₃— | H | 166–167(760) | 1.4648(24) | 60 | C₆H₁₄N₂ |
| V | C₂H₅— | H | 89–90(20) | 1.4613(20) | 68 | C₇H₁₆N₂ |
| VI | (CH₃)₂CH— | H | 106–108(38) | 1.4663(25) | 42 | C₈H₁₈N₂ |
| VII | CH₃(CH₂)₃— | H | 110–114(20) | 1.4653(20) | 51 | C₉H₂₀N₂ |
| VIII | C₆H₅—CH₂— | H | 126(0.3) | 1.5400(20) | 71 | C₁₂H₁₈N₂ |
| IX | C₆H₅—CH₂CH₂— | H | 90–92(0.06) | 1.5349(24.5) | 66 | C₁₃H₂₀N₂ |
| X | (CH₃O)₂C₆H₃—CH₂CH₂— | H | 141–144(0.07) | 1.5420(25) | 70 | C₁₅H₂₄N₂O₂ |
| XI | HOCH₂CH₂— | H | 86(0.006) | 1.5050(20) | 56 | C₇H₁₆N₂O |
| XII | CH₃— | CH₃— | 54(13) | 1.4516(24) | 67 | C₇H₁₆N₂ |
| XIII | CH₃— | C₆H₅—CH₂— | 169–172(24) | 1.5237(25) | 80 | C₁₃H₂₀N₂ |
| XIV | C₈H₁₇— (2-ethyl hexyl) | C₈H₁₇— (2-ethyl hexyl) | 182–194(5) | 1.4614(26) | 78 | C₂₁H₄₄N₂ |

As previously indicated, the compounds of this invention are suitable for the preparation of certain 4-substituted quinolines and quinazolines as disclosed in our co-pending application Serial No. 34,877. In accordance with one embodiment of the disclosure in that application, a 1-substituted-3-pyrrolidylmethylamine of this invention is reacted with a 4-chloroquinazoline or a 4-mercaptoquinazoline to produce a 4(1-substituted-3-pyrrolidylmethylamino)quinazoline. Examples of the procedure are as follows:

A. *From 4-chloroquinazoline.*—To a solution of 8 g. (0.049 mole) of 4-chloroquinazoline in 200 ml. of anhydrous ether was added, in one portion, 11.1 g. (0.097 mole) of 1-methyl-3-pyrrolidylmethylamine as a solution in 60 ml. of anhydrous ether. The resulting solution became cloudy immediately with precipitated hydrochloride. After standing at room temperature for twenty-four hours, the ether was removed on the steam bath and the residue dissolved in 150 ml. of water. The water solution was made alkaline (pH 12–13) with 20% sodium hydroxide and the oily mixture extracted three times with chloroform. The combined chloroform extracts were washed once with water, once with saturated sodium chloride solution and then dried over magnesium sulfate. After removing the chloroform the residual oil was dissolved in 50 ml. of hot acetonitrile, the solution treated with Norite brand activated charcoal, cooled, and seeded to yield 7.1 g., 61%, M.P. 109.5–111°.

B. *From 4-mercaptoquinazoline.*—4-mercaptoquinazoline, 23.1 g. (0.143 mole) prepared as disclosed in Leonard and Curtin, J. Org. Chem., 11, 349 (1946), and 1-methyl-3-pyrrolidylmethylamine, 24.4 g. (0.214 mole), were placed in a 100-ml. round bottom flask equipped with a reflux condenser and the mixture heated in an oil bath at 110–115° for thirty minutes longer than the time required to effect solution. Hydrogen sulfide was evolved during the heating period. The reaction mixture was cooled slightly and enough chloroform added to make the mixture fluid. The mixture was placed in a separatory funnel and washed once with ice cold 10% sodium hydroxide and then with water. After drying over magnesium sulfate, the chloroform was removed in vacuo and the residual oil diluted slightly with butanone and chilled to give a solid mass. Seed crystals were removed and the material (treated with activated charcoal) recrystallized twice from acetonitrile to yield 22.7 g. (66%), M.P. 111–112°.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

We claim:
1. 1-lower alkyl-3-(anilinomethyl)pyrrolidine.
2. 1-methyl-3-(anilinomethyl)pyrrolidine.
3. 1-(hydroxyalkyl)-3-(aminomethyl)pyrrolidine.

References Cited in the file of this patent
UNITED STATES PATENTS 2,651,639  Angier _____ Sept. 8, 1953
3,031,452  Shen et al. _____ Apr. 24, 1962

FOREIGN PATENTS 197,817  Austria _____ May 27, 1958

OTHER REFERENCES

Reitsema: J. American Chem. Soc., vol. 71, pages 2041–2043 (1949).
Bergmann: The Chemistry of Acetylene and Related Compounds, p. 80 (1948).

UNITED STATES PATENT OFFICE
CERTIFICATE OF CORRECTION

Patent No. 3,133,082

May 12, 1964

Yao Hua Wu et al.

It is hereby certified that error appears in the above numbered patent requiring correction and that the said Letters Patent should read as corrected below.

Column 3, line 3, for "pyrolidine", in italics, read -- pyrrolidine --, in italics; line 55, for "$n_{D24}$" read -- $n_D^{24}$ --; line 57, for "$n_{D25}$" read -- $n_D^{25}$ --; column 4, line 74, for "(aminoethyl)" read -- (aminomethyl) --; column 5, line 2, for "$n_D^{20}$" read -- $n_D^{20}$ --.

Signed and sealed this 8th day of September 1964.

(SEAL)
Attest:

ERNEST W. SWIDER
Attesting Officer

EDWARD J. BRENNER
Commissioner of Patents